United States Patent [19]

Holtermann et al.

[11] Patent Number: 4,685,548
[45] Date of Patent: Aug. 11, 1987

[54] CONTROL SYSTEM FOR SPEED SYNCHRONIZED CLUTCH OPERATION DURING GEAR SHIFT OF ENGINE DRIVEN TRANSMISSION

[75] Inventors: Otto Holtermann, Langenargen; Klaus Torbusch, Ahausen; Gerold Bieber, Langenargen, all of Fed. Rep. of Germany

[73] Assignee: Zahnradfabrik Friedrichshafen, AG, Friedrichshafen, Fed. Rep. of Germany

[21] Appl. No.: 876,861
[22] PCT Filed: Oct. 21, 1985
[86] PCT No.: PCT/EP85/00555
§ 371 Date: Jun. 18, 1986
§ 102(e) Date: Jun. 18, 1986
[87] PCT Pub. No.: WO86/02604
PCT Pub. Date: May 9, 1986

[51] Int. Cl.⁴ ............................................. B60K 41/28
[52] U.S. Cl. ................................ 192/0.08; 192/0.092; 192/3.31; 192/3.62; 74/733
[58] Field of Search ...................... 192/3.31, 0.08, 3.27, 192/0.092, 3.26, 0.062, 3.62, 3.61, 3.58, 3.22, 3.25; 74/872, 861, 866, 731, 732, 733

[56] References Cited

U.S. PATENT DOCUMENTS

| | | | |
|---|---|---|---|
| 3,129,795 | 4/1964 | Goeschel et al. | 192/0.062 |
| 3,645,366 | 2/1972 | Numazawa et al. | 192/3.56 X |
| 3,876,028 | 4/1975 | Asano et al. | |
| 4,344,513 | 8/1982 | Etienne | 192/0.092 X |
| 4,505,368 | 3/1985 | Ackerman et al. | 192/0.092 |
| 4,601,369 | 7/1986 | Hattori et al. | 192/3.58 |

FOREIGN PATENT DOCUMENTS 2154235 5/1973 France .
2172622 9/1973 France .

OTHER PUBLICATIONS

Patent Abstracts of Japan, Band 7, No. 141 (M-223) (1286) Jun. 21, 1983 & JP, A, 56150935 (Mitsubishi K.K.) 3/1983.

Primary Examiner—George H. Krizmanich
Attorney, Agent, or Firm—Zalkind & Shuster

[57] ABSTRACT

Control system for a pressure medium operated clutch (1) and reduction gear unit (4) to qualitatively improve torque reversal gear shifts by measurement of rotational speeds of the gear unit input shaft (41) and the turbine shaft (320) of a torque converter (3) through sensors (51, 52) and determination of differential speed conditions by an electronic unit (5) to which the sensors are connected. Upon displacement of the gear shift lever from neutral to gear drive position, the electronic unit issues a corrective fuel controlling command through line (22) for a length of time sufficient to obtain equality between the turbine speed (Nt) and the gear input speed (Ni) plus a correction factor (AN). The corrective command is applied to a control lever (71) of the engine fuel injection pump (7) through an automatic operating arrangement (90) superimposed on the fuel control linkage (8) connected to the control lever.

23 Claims, 5 Drawing Figures

CONTROL SYSTEM FOR SPEED SYNCHRONIZED CLUTCH OPERATION DURING GEAR SHIFT OF ENGINE DRIVEN TRANSMISSION

BACKGROUND OF THE INVENTION

This invention relates to a control system for a pressure operated clutch adapted to be engaged under speed synchronized conditions to smoothly transmit torque to a change speed gear unit.

Control systems of the foregoing type are known and used for most variable friction clutches, including dry and wet clutches in association with various vehicle gear transmissions. Often, a fluid torque converter having a by-pass clutch associated therewith is disposed between the engine and the speed synchronized clutch as disclosed for example in German Pat. No. 33 05 999. The use of such control systems enables manual gear shift control by inexperienced drivers under most difficult conditions to a qualitively acceptable degree in so far as road traction is concerned. However, such control systems do not as yet enable gear shift control by an inexperienced driver with satifactory quality in so far as torque reversing gear shifts are concerned.

It is therefore an object of the present invention to provide a control system for a pressure operated clutch associated with a reduction gear unit, wherein speed synchronization between clutch elements is achieved for good quality drive ratio change operation under driver control, including those drive ratio changes which involve a reversal of torque.

SUMMARY OF THE INVENTION

In accordance with the present invention, speed adjustment of the clutch elements of the gear shift transmission clutch engageable after each gear shift operation is completed, is effected with the assistance of the transmission driving engine in an automatic speed synchronizing operational mode.

As a result of engine idling and rotation of the output shaft of the gear unit at a high speed following torque reversing gear shifts, a relatively large speed differential between the input and output shafts of the gear unit occurs. Such differential speed condition is remedied by automatic engine acceleration of the drive train between the engine and the clutch by simply actuating the engine fuel control to thereby achieve a substantial improvement in the gear shift characteristic. Various factors affect such corrective action through the engine fuel control including for example the turbine of the torque converter disposed in the drive train between the engine and the clutch and the rotational speed of the input shaft of the gear unit. Such rotational speeds are compared through an electronic unit to generate a corrective fuel controlling signal command of a duration sufficient for an increasing turbine speed to exceed the speed of the input shaft to the gear unit by a correction factor.

In order to avoid any interruption in the corrective signal command, generation of such command is limited to a gear shift from neutral to a low drive ratio. Detection of such shift condition is effected electrically to simply signal the electronic unit.

The corrective signal command for fuel control actuation is applied advantageously through an automatic operating arrangement at the fuel injection pump or superimposed on the throttle control linkage so as not to interfere with manual driver control and avoid unnecessary duplication of parts already associated with the existing fuel control system for the engine.

Where fuel control actuation by the driver is effected through a fuel control system having a gas pedal mechanically connected to a control lever for the fuel injection pump, for example, then the superimposed automatic operating arrangement may advantageously involve use of a pressure medium in a piston-cylinder mechanism. If the control lever of the fuel injection pump is operated however by a so-called electronic gas pedal, then the corrective command issued from the electronic unit 5 may be directly superimposed on the electronic gas pedal of such fuel control system.

BRIEF DESCRIPTION OF DRAWING FIGURES

Further details of the invention will be explained on the basis of an embodiment shown by way of example in the accompanying drawings, in which.

DETAILED DESCRIPTION OF PREFERRED EMBODIMENT

Figure 1:
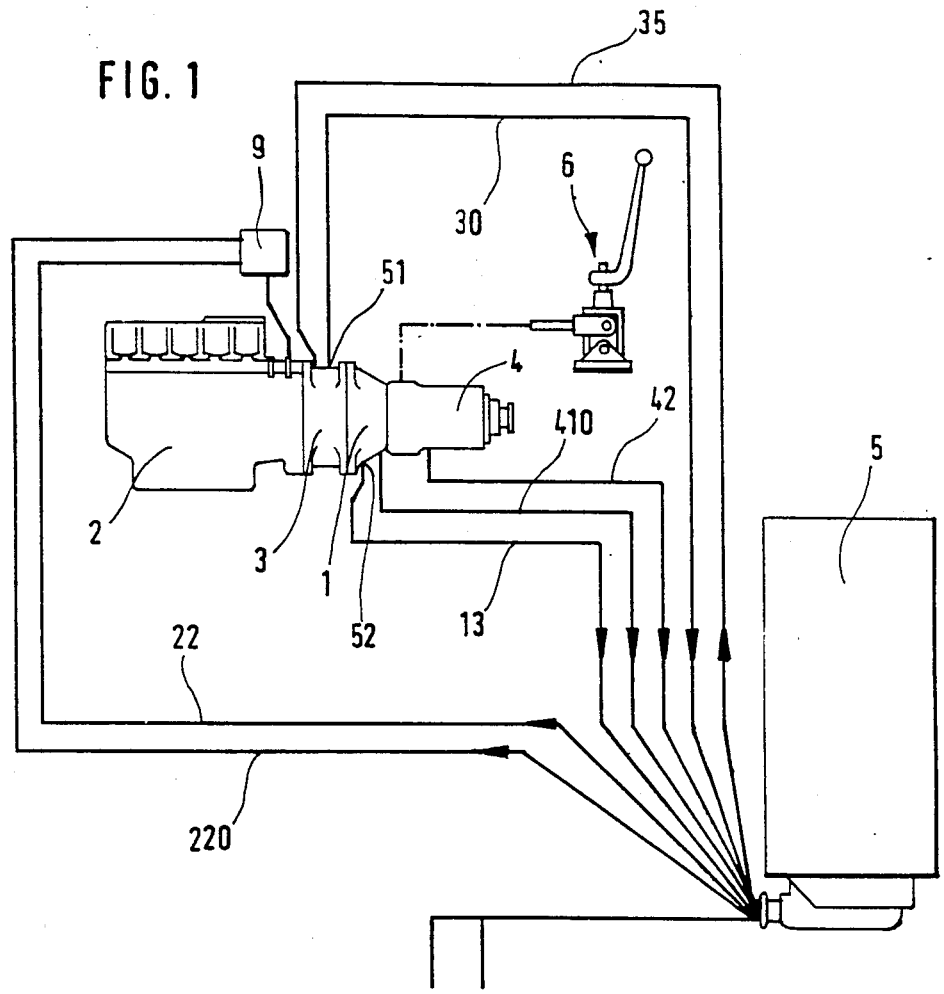
FIG. 1 is a side elevation view of a typical arrangement of engine, torque converter, clutch, gear unit and gear shift control in association with electronic controls schematically illustrated.
Figure 2:
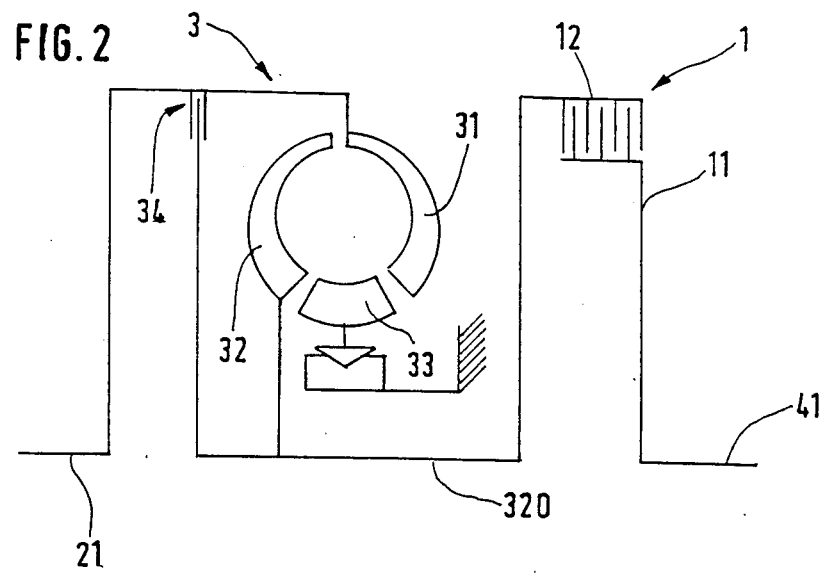
FIG. 2 is a more detailed, but schematic illustration of the torque converter and clutch arrangement shown in FIG. 1.
Figure 5:
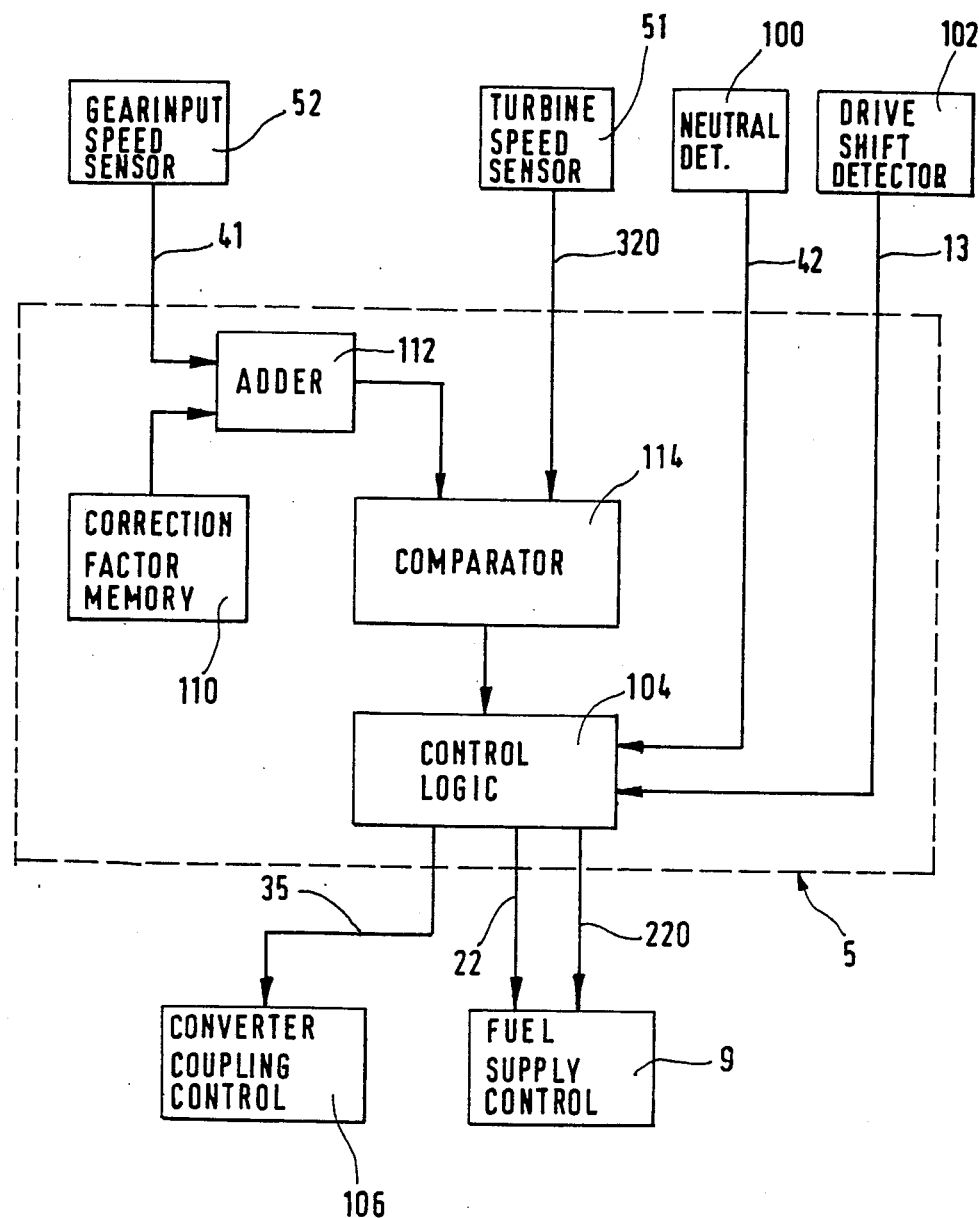
FIG. 5 is a functional block diagram of the control system associated with the arrangements shown in FIGS. 1, 2 and 4 and the operational program depicted in FIG. 3.

FIG. 1 illustrates an engine 2 drivingly connected by a fluid torque converter 3 and clutch 1 to a reduction gear unit 4. An electronic unit 5 is provided to which input speed measurement signals are fed through line 30 by a speed sensor at 51 from the turbine of the torque converter. A speed sensor at 52 also feeds a speed signal input through line 13 from the input shaft 41 of the gear unit, as shown in FIG. 2, to the electronic unit 5. A neutral condition of the gear unit 4 is detected and reported through line 410 to the electronic unit while shift of the gear unit by gear shift control 6 from neutral into a gear drive ratio condition is detected and reported through line 42. A corrective fuel control command is issued from the electronic control unit 5, depending on the programming of its control logic 104, through lines 22 and 220 to the engine fuel control 9. The control logic 104 as shown in FIG. 5 also issues control signals through line 35 to converter coupling 34 shown in FIG. 2. The reduction gear unit 4 is shifted mechanically by the driver through the gear shift control 6.

FIG. 2 schematically illustrates the arrangement of the clutch 1 and torque converter 3 having an impeller 31 to which the engine is connected by engine driven shaft 21. The output turbine 32 of the torque converter is connected to shaft 320, the torque converter also having a reaction element 33 and a by-pass clutch 34 coupling the engine shaft 21 to the turbine shaft 320. The clutch 1 includes two coupling elements 12 and 11 respectively connected to the turbine shaft 320 and input shaft 41 to the gear unit.

Figure 3:
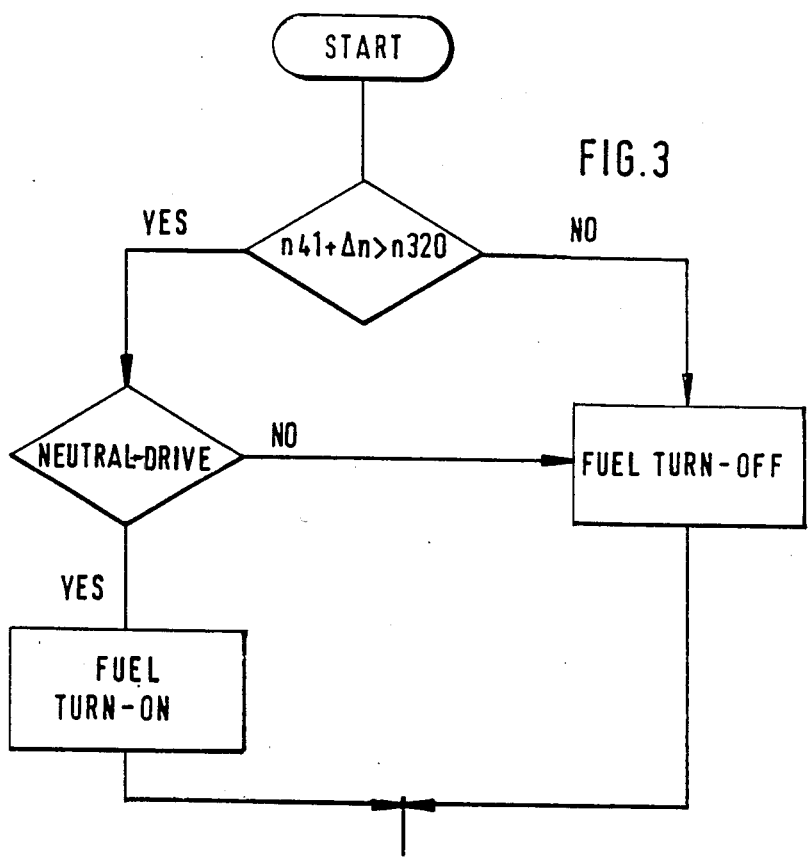
FIG. 3 is a flow diagram of the operational program associated with the control system of the present invention.
Figure 4:
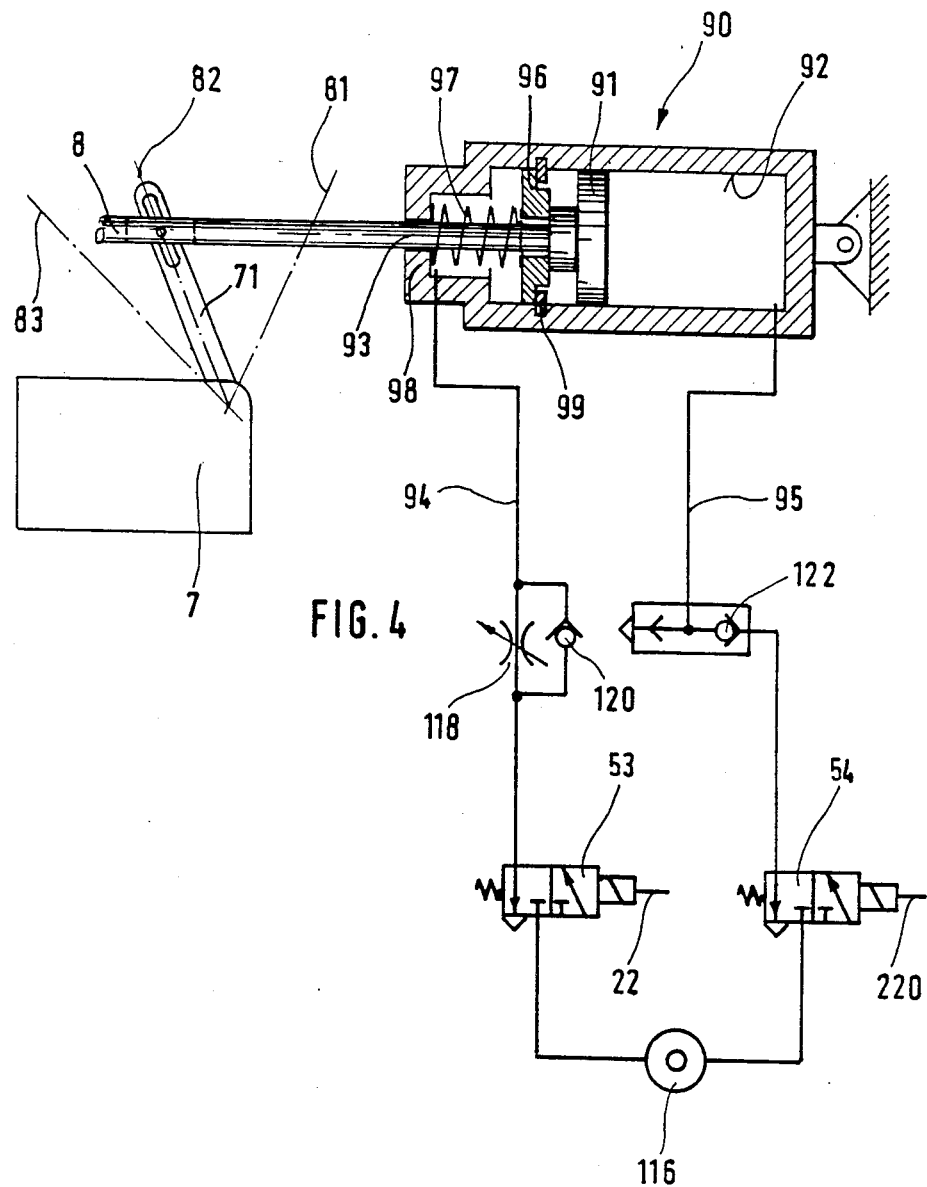
FIG. 4 is a fluid circuit diagram for an engine fuel control operating arrangement, superimposed on a fuel injection pump asociated with the engine fuel supply system.

The control system of the present invention functions in a speed synchronizing operational mode by corrective commands to the fuel injection pump 7 aforementioned or alternatively to the throttle linkage of a fuel carburetor as the fuel supply for the engine, in accordance with an operational program as outlined in FIG. 3 by means of the hardware shown in FIGS. 1, 2 and 4, which is functionally depicted in FIG. 5. After a fuel controlling corrective action is called for from measurements of speed of the gear input shaft 41 by sensor 52 and of the turbine shaft 320 by sensor 51, detector 100 senses whether or not the gear shift control lever 6 has been displaced from its neutral position in a direction toward a gear drive position. The corrective fuel supply command will therefore occur only during such phase in the gear shifting operation. Furthermore, such corrective action will be effective to increase the speed of the turbine shaft 320 so as to slightly exceed the speed of the gear shaft 41 by a correction factor of $\Delta N$. Such correction factor $\Delta N$ is obtained from data stored in the memory 110 of the electronic unit 5 and is introduced through adder component 112 when comparing the speeds of the turbine and gear input shafts through comparator 114 as depicted in FIG. 5.

The corrective fuel controlling command will issue from the control logic 104 of the control unit 5 through lines 22 and 220 to operate the engine fuel control 9 as shown in FIG. 1. FIG. 4 illustrates one embodiment in which the command from control unit 5 in lines 22 and 220 is applied to the fuel injection pump 7 by means of magnetically operated valves 53 and 54 of an operating arrangement 90 operatively connected to the control linkage 8 of the injection pump 7.

As shown in FIG. 4, the valves 53 and 54 respectively actuated by command signals in lines 22 and 220, form part of a fluid control circuit conducting a pressure medium to the operating arrangement 90 derived from a pump 116 to which the valves 53 and 54 are connected. Pressurized medium is supplied to conduit 94 under control of valve 53 through an adjustable restrictor 118 connected in parallel with a reverse flow check valve 120. Pressurized medium is also supplied to a conduit 95 under control of valve 54 through a check valve 122.

The operating arrangement 90 consists of a cylinder 92 to which conduits 94 and 95 are connected at opposite ends. A piston 91 is disposed in the cylinder and is connected by its piston rod 93 to the control linkage 8 through which the injection pump 7 is operated both manually by the vehicle driver and automatically by the operating arrangement 90 through lever 71. The lever 71 is displaced by either method between full throttle position 81, idling position 82 and fuel cut-off position 83 as shown in FIG. 4.

In the middle idling position 82, the piston 91 is held in abutment with a second piston 96 by pressure in chamber 92 of the cylinder to which conduit 95 is connected. The second 96 in the position shown against stop 99 by the bias of spring 97 reacting between the piston 96 and the end wall 98 of the cylinder. The piston-cylinder arrangement 90 will thus displace the control lever 71 between its position 81, 82 and 83 under control of valves 53 and 54 in accordance with the following table:

| LOGIC | VALVE ACTUATION | |
|---|---|---|
| | 53 | 54 |
| Manual gas pedal operation | 0 | 0 |
| Full throttle position 81 | 1 | 0 |
| Idling position 82 | 1 | 1 |
| Fuel turn-off position 83 | 0 | 1 |

It will be apparent from the foregoing table and FIG. 4, than when valve 53 alone is actuated the spring chamber of the cylinder is pressurized through conduit 94 displacing piston 91 in a right hand direction as viewed in FIG. 4 to bring lever 71 to its full throttle position 81. With both valves 53 and 54 actuated, both chambers on opposite sides of piston 91 are pressurized through conduits 94 and 95 to hold lever 71 in its middle idling position 82 as shown on FIG. 4. When both chambers are depressurized through valves 53 and 54, the lever 71 may be displaced manually. For fuel cut-off, only valve 54 is actuated to pressurize chamber 92 causing the piston 91 to be displaced in a left hand direction as viewed in FIG. 4 moving the lever 71 to its fuel turn-off position 83. Thus, the logic signal levels in lines 22 and 220 connected to the valves 53 and 54 will determine the fuel control position of lever 71 as outlined in the foregoing table.

As an alternative to the pressure medium type of operating arrangement 90 described, the control lever 71 could be electrically actuated by an electronially controlled motor. Such motorized control would also be subject to manual gas pedal actuation through electrical means.

The automatic corrective commands applied to control lever 71 through valves 53 and 54 as hereinbefore described, are dictated by the operational program of the control unit 5 as outlined in FIG. 3. As shown, upon start of an operational program the rotational speeds are compared to detect a drive condition expressed as: $Ni+\Delta N>Nt$, where (Ni) is the rotational speed of gear input shaft 41, (Nt) is the rotational speed of the turbine shaft 320 and $\Delta N$ is the drive condition factor as aforementioned. When such drive condition does not exist, corresponding to a turbine speed (Nt) that is too high as compared to the gear input speed (Ni), a high logic fuel cut-off command is generated as depicted in FIG. 3 and applied only through line 220 to valve 54 to effect fuel cut-off as hereinbefore outlined in the table. On the other hand, if the condition does exist then the program proceeds to detection of a condition reflecting shift from neutral to a gear drive ratio in the gear unit. If the latter condition does not exist, again fuel cut-off is effected. If the latter condition does exist, then acceleration of the turbine shaft 320 is automatically effected in a speed synchronizing operational mode involving generation of a high logic command in line 22 to only the valve 53 for increase in engine speed by displacing the control lever 71 to the full throttle position for a period of time until $Ni+\Delta N=NT$.

We claim:

1. In combination with an engine (2) having a speed controlling device (7, 9) for varying engine speed, a gear unit (4), a clutch (1) having coupling elements (11, 12) respectively coupled to the engine and the gear unit, means (106) for controlling engagement of the coupling elements of the clutch to drivingly interconnect the engine and the gear unit and gear shift means (6) operatively connected to the gear unit for change in drive ratio thereof, the improvement comprising control means (5) operatively connected to the speed controlling device for operation thereof in a speed synchronizing mode affecting relative rotation of the coupling elements, means (100, 102) opertively connecting the gear shift means to the control means for initiating said speed synchronizing mode of operation of the speed controlling device in response to said change in drive ratio of the gear unit and a pair of speed sensing devices (51, 52) for respectively measuring the rotational speeds of the coupling elements, said control means including comparing of means connected to the sensing devices for determining drive condition as a function of the measured rotational speeds of the coupling elements.

2. The combination of claim 1 including means (21, 31, 32, 320) coupling the engine to one of the coupling elements (12) of the clutch, said control means (5) being operative through the engine speed controlling device in said speed synchronizing mode of operation to increase the rotational speed of said one of the coupling elements in response to a reversal in the change in drive ratio of the gear unit.

3. The combination of claim 2 wherein said means coupling the engine to the clutch includes a torque converter (3) having a turbine (32) connected to said one of the coupling elements (12) of the clutch and a by-pass clutch (34) coupling the engine directly to said one of the coupling elements, said speed sensing devices (51, 52) being respectively disposed in operative relation to the turbine and the other of the coupling elements (11), said control means (5) being operative to issue a command to the engine speed controlling device (7) to increase the rotational speed of the turbine.

4. The improvement as defined in claim 3 wherein said drive condition function is (Ni+ΔN), whereas (Ni) is the rotational speed of said other of the coupling elements (11) and (ΔN) is a correction factor dependent on the controllable coupling means, said command being issued only when the drive condition function is greater than the rotational speed of the turbine (Nt), said command being maintained until $Ni + \Delta N = Nt$.

5. The improvement as defined in claim 4 wherein the drive ratio change responsive means includes means responsive to displacement of the gear shift means (6) from a neutral to an operative drive position for enagling the control means to issue said command.

6. The combination of claim 5 wherein said speed controlling drive (7) includes a throttle control lever (71) displaceable to a full throttle position (81) in response to the command issued by the control means (5).

7. The combination of claim 5 wherein said speed controlling device includes a fuel injection pump (7), a throttle control linkage (8) connected to the pump and fluid motor means (90) connected to the control linkage for displacement thereof between full throttle and idling positions (81, 82) during the speed synchronizing mode of operation, and a pair of control valves (53, 53) operatively connecting the control means (5) to the fluid motor means.

8. The combination of claim 7 wherein said throttle control linkage is furthermore displaceable to a fuel cut-off position (83) in which the pump is disabled.

9. The improvement as defined in claim 8 wherein the fluid motor means (90) includes a cylinder (92), a piston (91) displaceable within the cylinder, a piston rod (93) connecting the piston to the throttle control linkage (8) a second piston (96) displaceable within the cylinder, a spring (97) biasing the second piston into engagement with the first mentioned piston (91), a stop (99) in the cylinder limiting displacement of the second piston and fluid pressure means (94, 95) operatively connecting the control valves (53, 54) to the cylinder for displacement of the pistons (91, 96) and the throttle control linkage (8) to the idling position (82) when both of the control valves are in flow blocking positions.

10. The improvement as defined in claim 9 including pump control means (71) operatively connecting the throttle control linkage (8) to the pump (7) for exclusive driver control of the pump independently of the fluid motor control means (90) in the idling position (82) of the control linkage.

11. The improvement as defined in claim 1 wherein said drive condition function is expressed as $(Ni + \Delta N) \geq (Nt)$, where (Ni) is the rotational speed of one of the coupling elements (11) connected to the gear unit, (Nt) is the rotational speed of the other of the coupling elements (12) and (ΔN) is a correction factor.

12. In combination with an engine (2) having a speed controlling device (7, 9) for varying engine speed, a gear unit (4), a clutch (1) having coupling elements (11, 12) respectively coupled to the engine and the gear unit, means (106) for controlling engagement of the coupling elements of the clutch to drivingly interconnect the engine and the gear unit and gear shift means (6) operatively connected to the gear unit for change in drive ratio thereof, the improvement comprising control means (5) operatively connected to the speed controlling device for operation thereof in a speed synchronizing mode affecting relative rotation of the coupling elements, means (100, 102) operatively connecting the gear shift means to the control means for initiating said speed synchronizing mode of operation of the speed controlling device in response to said change in drive ratio of the gear unit, said control means (5) being operative through the engine speed controlling device in said speed synchronizing mode of operation to increase the rotational speed of said one of the coupling elements in response to a reversal in the change in drive ratio of the gear unit, a torque converter (3) connected to the engine and having a turbine (32) connected to one of the coupling elements (12) of the clutch and a by-pass clutch (34) coupling the engine directly to said one of the coupling elements, said speed sensing devices (51, 52) being respectively disposed in operative relation to the turbine and the other of the coupling elements (11), said control means (5) being operative to issue a command to the engine speed controlling device (7) to increase the rotational speed of the turbine.

13. The improvement as defined in claim 12 wherein said drive ratio change responsive means includes means responsive to displacement of the gear shift means (6) from a neutral to an operative drive position for enabling the control means to issue said command.

14. The combination of claim 12 wherein said speed controlling device (7) includes a throttle control lever (71) displaceable to a full throttle position (81) in response to the command issued by the control means (5).

15. In combination with an engine (2) having a speed controlling device (7, 9) for varying engine speed, a gear unit (4), a clutch (1) having coupling elements (11, 12) respectively coupled to the engine and the gear unit, means (106) for controlling engagement of the coupling elements of the clutch to drivingly interconnect the engine and the gear unit and gear shift means (6) operatively connected to the gear unit for change in drive ratio thereof, the improvement comprising control means (5) operatively connected to the speed controlling device for operation thereof in a speed synchronizing mode affecting relative rotation of the coupling elements, means (100, 102) operatively connecting the gear shift means to the control means for initiating said speed synchronizing mode of operation of the speed controlling device in response to said change in drive ratio of the gear unit and said speed controlling device including a fuel injection pump (7), a throttle control linkage (8) connected to the pump and fluid motor means (90) connected to the control linkage for displacement thereof between full throttle and idling positions (81, 82) during the speed synchronizing mode of operation, and a pair of control valves (53, 54) operatively connecting the control means (5) to the fluid motor means.

16. The combination of claim 15 wherein said throttle control linkage is furthermore displaceable to a fuel cut-off position (83) in which the pump is disabled.

17. The improvement as defined in claim 15 wherein the fluid motor means (90) includes a cylinder (92), a piston (91) displaceable within the cylinder, a piston rod (93) connecting the piston to the throttle control linkage (8), a second piston (96) displaceable within the cylinder, a spring (97) biasing the second piston into engagement with the first mentioned piston (91), a stop (99) in the cylinder limiting displacement of the second piston and fluid pressure means (94, 95) operatively connecting the control valves (53, 54) to the cylinder for displacement of the pistons (91, 96) and the throttle control linkage (8) to the idling position (82) when both of the control valves are in flow blocking positions.

18. The improvement as defined in claim 17 including pump control means (71) operatively connecting the throttle control linkage (8) to the pump (7) for exclusive driver control of the pump independently of the fluid motor control means (90) in the idling position (82) of the control linkage.

19. In a method of synchronizing rotation of coupling elements of a clutch (1) engaged to drivingly connect a gear unit (4) to an engine (2) having a fuel supply controlling device (7, 9) including the steps of measuring the rotational speeds of the coupling elements; and detecting shift of the gear unit between neutral and drive conditions, the improvement comprising the steps of: modifying the rotational speed measurement (Ni) of one of the coupling elements (11) by adding thereto a correction factor ($\Delta N$); comparing said modified rotational speed measurement (Ni+$\Delta N$) to the rotational speed measurement (Nt) of the other of the coupling elements (12); issuing a command to the fuel supply controlling device for accelerating the engine to vary the rotational speed of said other of the coupling elements in response to the detection of a shift of the gear unit to the drive condition; and continuing said acceleration of the engine under said command until said rotational speed measurement (Nt) of the other of the coupling elements and said modified rotational speed measurement (Ni+$\Delta N$) being compared therewith are substantially equal.

20. In combination with an engine (2) having a speed controlling device (7, 9) for varying engine speed, a gear unit (4), a clutch (1) having coupling elements (11, 12) respectively coupled to the engine and the gear unit, means (106) for controlling engagement of the coupling elements of the clutch to drivingly interconnect the engine and the gear unit, gear shift means (6) operatively connected to the gear unit for change in drive ratio thereof, a pair of speed sensing devices (51, 52) for respectively measuring rotational speed (Ni, Nt) of the coupling elements, comparator means (114) connected to the speed sensing devices for comparing the actual measured rotational speed (Nt) of one of the coupling elements (12) with a drive condition function of the measured rotational speed (Ni) of the other of the coupling elements (11) and control means (104) operatively connecting the comparator means to the speed controlling device for operation thereof in a speed synchronizing mode maintaining said drive condition function greater than the measured rotational speed (Nt) of said one of the coupling elements until equality is achieved between said function and the rotational speed of said one of the coupling elements.

21. The combination of claim 20 wherein said drive condition function is Ni+$\Delta N$, wherein $\Delta N$ is a correction factor.

22. The combination of claim 21 including detector means (100, 102) operatively connected to the gear shift means and the control means for initiating said speed synchronizing mode of operation in response to displacement of the gear shift means from a neutral position to a drive ratio position.

23. The combination of claim 20 including detector means (100, 102) operatively connected to the gear shift means and the control means for initiating said speed synchronizing mode of operation in response to displacement of the gear shift means from a neutral position to a drive ratio position.

* * * * *